Nov. 16, 1954  B. W. SHREWSBURY  2,694,421
TRACTOR MOUNTED TIMBER MOWING SAW CARRYING DEVICE
Filed Sept. 29, 1948  2 Sheets-Sheet 1
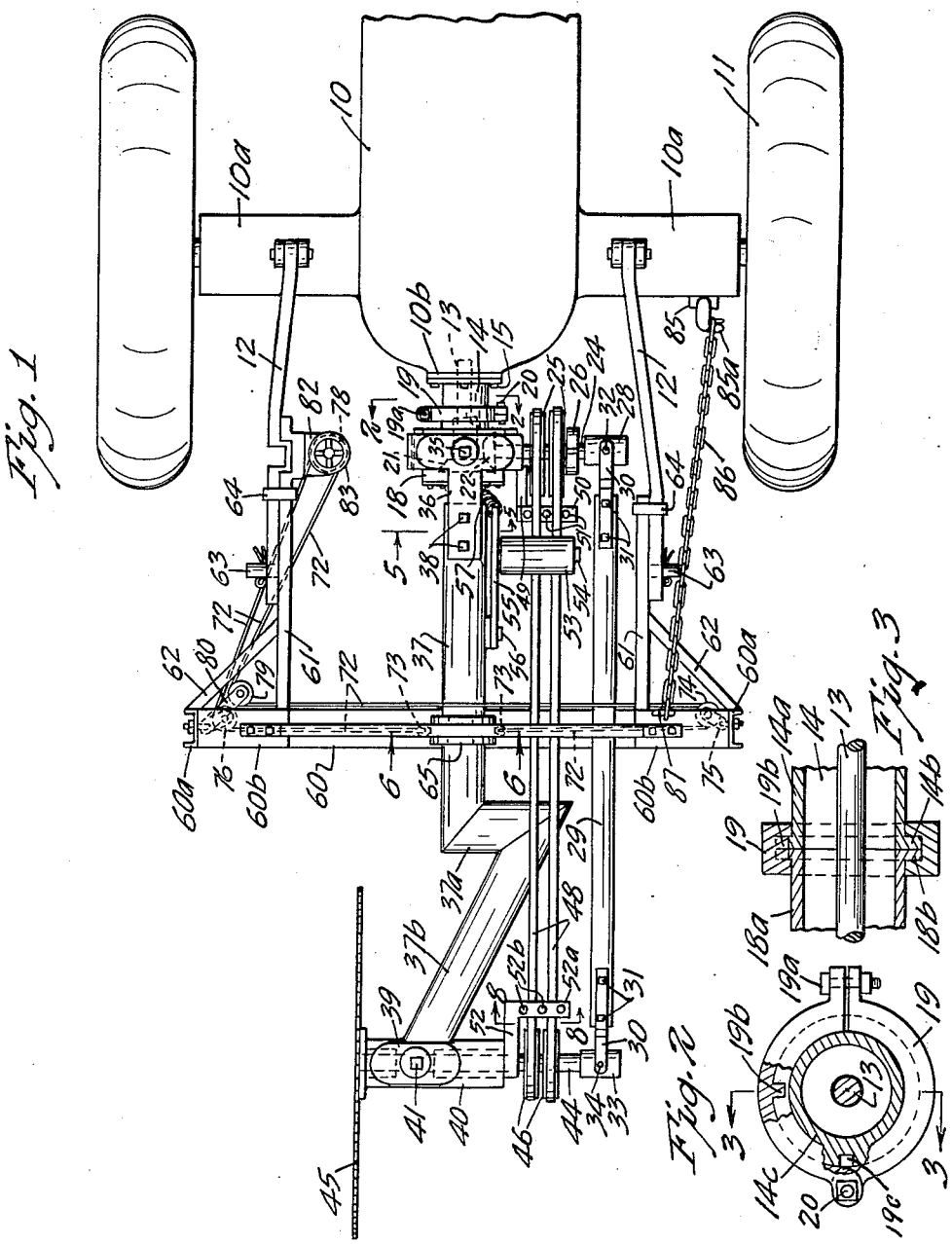
Inventor
BENJAMIN W. SHREWSBURY
By Chas. C. Reif
Attorney

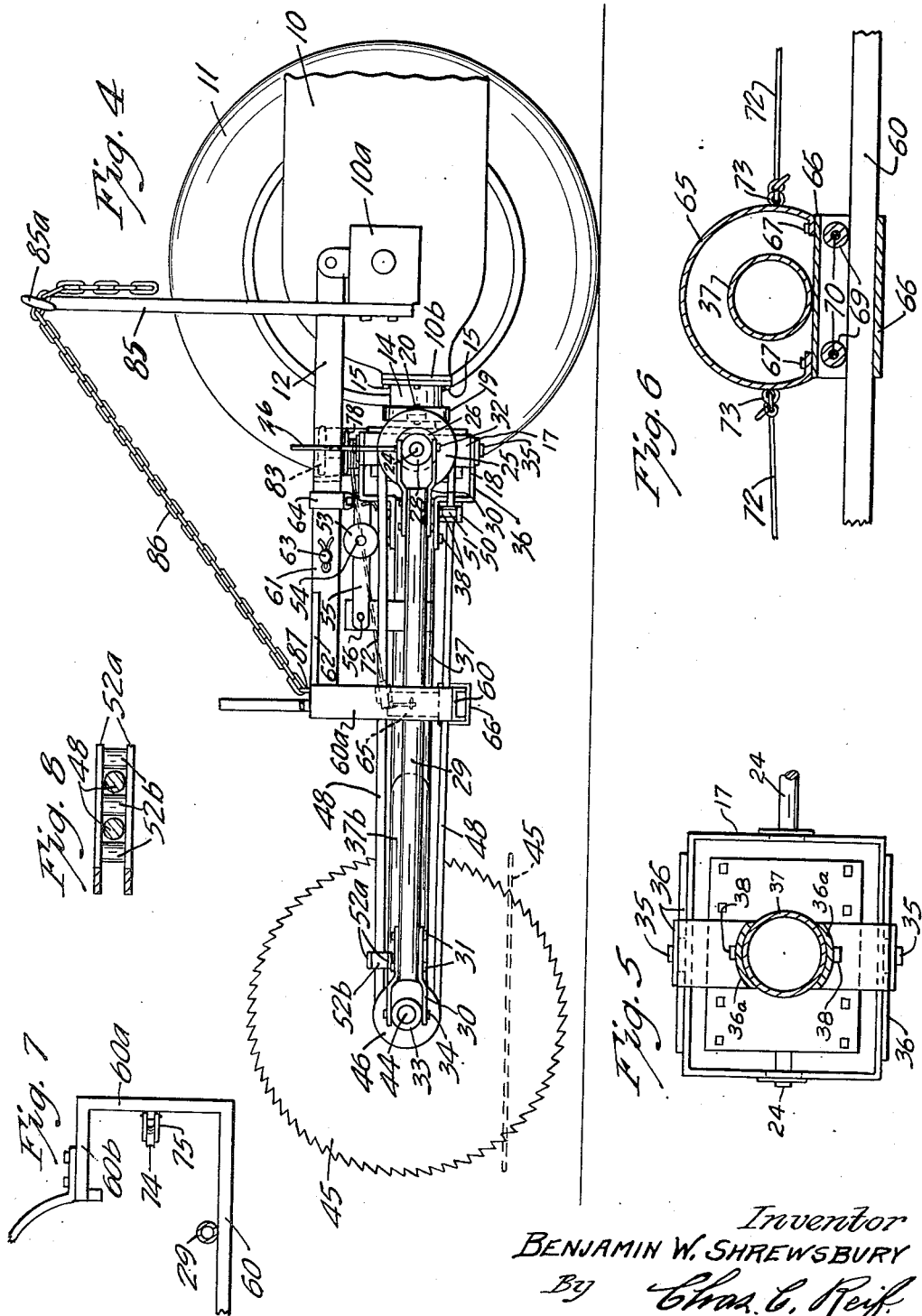

United States Patent Office 2,694,421
Patented Nov. 16, 1954

2,694,421

TRACTOR MOUNTED TIMBER MOWING SAW CARRYING DEVICE

Benjamin W. Shrewsbury, Minneapolis, Minn.

Application September 29, 1948, Serial No. 51,720

6 Claims. (Cl. 143—43)

This invention relates to a circular saw and to a device for carrying the same adapted to be connected to a tractor so that said saw can be operated from the power takeoff shaft of said tractor.

It is desirable to have a circular saw which can be power driven and which is disposed at one end of the tractor so that it can be advanced at said end to the material to be cut. It is also desirable to have a saw which can be moved in a general direction of its axis and which can be moved in a direction at right angles to its axis and borught quite close to the ground. One difficulty with such power driven saws in the prior art is that the movement of the saw was too greatly limited and it could not be brought into the desired positions to cut the trees which were to be cut down. In many places there are large trees as well as small trees, some of the latter really constituting brush. It is desirable to have a saw which can operate upon all sizes and kinds of trees and brush and which can be brought into the desired positions for efficiently cutting said trees or brush.

It is an object of this invention to provide a circular saw and a device for carrying the same, which device is constructed and arranged to be attached to the tractor for oscillating movement about the axis of the power takeoff shaft, said device comprising a second shaft extending at right angles to said power takeoff shaft and geared thereto, a member extending longitudinally away from the tractor arranged for swinging movement about a vertical axis when the saw is in a vertical plane, a bearing carried by the outer end of said member, a third shaft journaled in said bearing, a saw secured to said third shaft and driving means connecting said second and third shafts whereby said member and saw can be swung laterally about a vertical axis and the same can be swung vertically about the axis of said second shaft.

It is another object of the invention to provide such a device as set forth in the preceding paragraph, together with a member extending substantially parallel to said second shaft beneath said first mentioned member, a member engaging said first mentioned and means secured to said last mentioned member for moving the same and said first mentioned member laterally in either direction to swing the same about a vertical axis.

It is a further object of the invention to provide a device as set forth in the preceding paragraphs, said member which extends beneath said first mentioned member having bars rigidly secured thereto adjacent each end thereof and extending toward said tractor, said bars having pins projecting from the outer sides thereof respectively adapted to be received in spaced links secured to said tractor and which are oscillated in vertical planes by said tractor whereby said first mentioned member and said member extending beneath the same can be swung upwardly about the axis of said second shaft to move said saw.

It is more specifically an object of the invention to provide a saw carrying device adapted to be secured to a tractor having a power takeoff shaft and a bracket projecting adjacent the same and having spaced vertically oscillatable links which comprises a casing secured to said bracket and oscillatable about the axis of said power takeoff shaft, a second shaft extending at right angles to said shaft and geared thereto, a pulley, preferably of the double type, secured to said second shaft, a member having a yoke engaging the top and bottom of said casing and secured thereto for swinging movement about a vertical axis, said member extending away from said casing and tractor, a bearing pivotally secured to the other end of said member, a third shaft journaled in said bearing, a circular saw secured to one end of said third shaft, a pulley, preferably of the double type secured to said third shaft, a pair of belts running over said pulleys on said second and third shafts respectively, a second member extending substantially parallel to said second shaft and beneath said first mentioned member, a yoke embracing said first mentioned member, a cable having its ends secured at opposite sides of said yoke, pulleys carried by said second member over which said cable runs, a reel about which said cable is wound, means for rotating said reel to move said cable and swing said first mentioned member in either direction about said vertical axis, said second member having bars secured thereto adjacent its ends and extending toward said tractor, said bars carrying pins adapted to be received in said links whereby said second member can be raised by said links and will in turn lift said first mentioned member and saw, the same swinging about the axis of said second shaft, said first mentioned member, said casing, second shaft, third shaft and saw being oscillatable about the axis of said power takeoff shaft to bring said saw into a horizontal plane.

These and other objects and advantages of the invention will be fully set forth in the following description made in connection with the accompanying drawings in which like reference characters refer to similar parts throughout the several views and in which:

Fig. 1 is a plan view of the device showing parts of the tractor to which it is attached;

Fig. 2 is a vertical section taken on line 2—2 of Fig. 1;

Fig. 3 is a vertical section taken on line 3—3 of Fig. 2;

Fig. 4 is a view in side elevation of the device; with near tractor wheel removed;

Fig. 5 is a vertical section taken on line 5—5 of Fig. 1;

Fig. 6 is a vertical section taken on line 6—6 of Fig. 1;

Fig. 7 is a partial view in front elevation; and

Fig. 8 is a partial vertical section taken on line 8—8 of Fig. 1, said sections being taken as indicated by the arrows.

Referring to the drawings, an end portion of a tractor 10 is shown having the wheels 11 and the axle housings 10a. A pair of links 12 are shown and these links are adapted to be swung in vertical planes by the power of said tractor, and by mechanism not shown. The tractor 10 has a power takeoff shaft 13 which extends through a bracket 14 secured to a boss 10b on the tractor by suitable bolts 15. Said bracket 14 has a cylindrical portion 14a and an outwardly extending flange 14b at the outer end thereof. A casing or gear box 18 is provided and this has a tubular or cylindrical portion 18a having a flange 18b at its end which abuts the flange 14b. Portions 14a and 18a are connected by a clamping ring 19 adapted to embrace said flanges and formed of swingable portions or halves which have projecting lugs at one side through which extends a pivot bolt 20. At the opposite side said portions have projecting lugs apertured to receive a headed and nutted clamping bolt 19a. Casing 18 is thus rigidly connected to bracket 14. Ring 19 is provided with an inwardly projecting lug 19b adapted to be received in recesses 19c in flanges 14b and 18b to hold said members 14 and 18 in position when casing 18 has been rotated through 90 degrees. The power takeoff shaft 13 has connected to its outer end a beveled gear 21 which meshes with another beveled gear 22 which is secured to a shaft 24, which shaft thus extends at right angles to shaft 13. Shaft 24 is journaled in casing 18 and has secured thereto at one side of said casing, pulleys 25. A clutch 26 is carried by shaft 24 at one side of pulleys 25 for connecting and disconnecting the pulleys 25 to shaft 24. Shaft 24 is journaled at its outer end in a bearing 28. A rigid link 29 is provided illustrated as made of a pipe or tube, and this has secured thereto adjacent its ends, straps or bars 30 at opposite sides thereof by suitable headed and nutted bolts 31. Bars 30 extend over the bearing 28 at opposite sides thereof and they are pivoted to said bearing by pivot screws 32. Similar bars 30 are secured at opposite sides of link 29 at its other end and these extend over opposite sides of a bearing 33 to which they are pivotally secured by screws 34. A yoke or frame 17 of general rectangular form extends about casing 18 and has portions through which shaft 24 extends so that said frame is swingable about the axis of shaft 24. A second yoke or frame 36 has portions extending over the top and bottom of yoke or frame 17 and is pivotally connected to yoke or frame 17 by the screws 35. Yoke 36 is thus swingable about the axis of screws 35 which is a vertical axis as shown in Figs. 1 and 4. Yoke 36 has portions 36a which extend downwardly at right angles and then extend outwardly and have curved portions 36a fitting over a cylindrical member 37 to which they are secured by suitable bolts 38. Member 37 can thus be swung in a vertical plane about the axis of shaft 24 and can also be swung in a horizontal plane about the common axis of screws 35. Member 37 extends longitudinally away from casing 18 and away from the tractor and has an intermediate portion 37a extending to one side at right angles thereto and said member has another portion 37b which extends at an acute angle to portion 37a, as shown in Fig. 1. Member 37b has plates 39 secured thereto which engage the top and bottom of a bearing 40 and to which bearing said plates are secured by pivot screws 41. A third shaft 44 is journaled in bearing 40 and the same has secured at one end thereof a circular saw 45. Shaft 44 projects from bearing 40 and has secured thereto one or more pulleys 46 which are aligned with pulleys 25. Shaft 44 continues beyond pulleys 46 and is journaled at its outer end in the bearing 33 already mentioned. A pair of belts 48 run over the pulleys 25 and 46 respectively. A bracket 49 is secured to casing 18 and has an arm extending parallel to belts 48, which arm supports a pair of vertically spaced plates 50 which are disposed above and below the lower runs of belts 48. Pins 51 extend between the plates 50 and these are disposed between and at the outer sides of belts 48 respectively. A bracket 52 similar to bracket 50 is secured to bearing 40 and has spaced top and bottom portions 52a disposed above and below the top runs of belts 48. Pins 52b extend between plates 52a between and at the outer sides of belts 48. A roller 53 extends over the top runs of belts 48 and is carried on a shaft 54 secured at one end in a plate or bar 55 pivoted by a bolt 56 to one side of member 37. A tensile coiled spring 57 is secured to the other end of bar 55 and extends downwardly and is secured at its lower end to plate 36.

A member 60 illustrated as in the form of a channel, extends transversely and substantially parallel to shaft 24 beneath member 37. Member 60 has portions 60a extending vertically at the ends thereof and horizontal portions 60b extend inwardly a short distance from the tops of portions 60a. Bars 61 are rigidly secured to portions 60b respectively and extend rearwardly or toward tractor 10. Braces 62 extend from member 61 to the vertical portions 60a respectively. Bars 61 have pins 63 projecting from the outer sides thereof respectively and these are arranged to pass through holes in links 12. Bars 61 are further secured to links 12 by clamps 64. A member 65 in the form of a semi-cylindrical yoke embraces member 37 above member 60 and is secured to a casing 66 by the bolts 67. Casing 66 is of rectangular form in cross section open at its ends and embraces the member 60. Rollers 69 are carried in casing 66, being journaled on small shafts or pins 70 secured at their ends in casing 66. Rollers 70 engage the top of member 60. A cable 72 is provided and this has its ends secured to eyelets 73 projecting at opposite sides of member 65. Cable 72 extends from opposite sides of member 65 and the same at one side runs over a sheave 74 swingingly mounted on a swinging bracket 75 which is pivoted to member 60. The cable at the opposite side of member 65 runs over a similar sheave 76 carried on a swinging bracket pivotally connected to member 60a. Cable 72 extends from sheave 76 to a reel 78 and has a certain number of convolutions on said reel. Said cable then extends from reel 78 to and around a sheave 79 carried in a bracket 80 swingingly connected to member 60 above the sheave 76. The cable 72 extends from sheave 79 to sheave 74. Reel 78 is supported upon a bracket 82 secured to the inner side of one of the bars 61. Said reel is provided at its top with a hand wheel 83 by means of which it can be rotated.

A bracket 85 is secured to one of the hub portions 10a of the tractor, the same having a hook 85a at its upper end, and said hook is adapted to receive and hold a portion of a chain 86 which is secured at its other end to a staple 87 on one of the portions 60b.

The saw 45 can be operated either in a vertical plane or a horizontal plane. When in a vertical plane, as shown in full lines in Fig. 1, shaft 24 will be driven from the power takeoff shaft 13 through the beveled gears 21 and 22. This will drive pulleys 25 and pulleys 46 will be driven through belts 48. Shaft 44 will thus be driven and saw 45 will be rotated. It will be seen that the tractor can be moved longitudinally to bring the saw 45 into engagement with a fallen tree or a log that is lying horizontally. The saw can be raised by raising links 12 of the tractor in the usual way which will raise or lift member 60 which will in turn lift member 37. Member 37 will be lifted and will swing about the axis of shaft 24, together with casing 18, links 29 and shaft 44. The shaft 44 can be raised and lowered quite a distance. When link 29 is under the portion 60b of member 60, it will be depressed when member 60 is lowered. The saw 45 can thus be conveniently moved for properly engaging and cutting through a tree or log. When it is desired to move the saw laterally, this can be done by turning wheel 83, which will wind up one end of the cable on reel 78 and pull member 75 transversely of member 60. This will cause member 37 to be swung about the axis of bolts or screws 35. Saw 45 can maintain its position with its blade in a plane at right angles to member 60 owing to the pivotal connection of member 37 with bearing 40. Saw 45 can thus be moved quite a distance laterally or in the direction of its axis. Logs or trees which are lying on the ground or in a horizontal position can thus be very conveniently cut.

When it is desired to cut standing trees, the member 37 will be moved so that link 29 is not beneath portion 60b. The shafts 24 and 44, together with member 37 can now be swung about the axis of the power takeoff shaft 13, the casing portion 18a moving in the ring 19, which ring will be loosened for this purpose by loosening bolt 21. These parts will be swung until saw 45 is disposed in a horizontal plane. It will be seen that pulleys 25 and 46 will swing with shafts 24 and 44. Member 37 will swing within the yoke 65. Ring 19 will be loosened, lug 18b seated in recess 14c and ring 19 then closed. With the saw in this position the same can now be raised or lowered as before described, by means of the links 12, and it can be swung in a horizontal plane by operating reel 78 by means of hand wheel 83. The saw can be brought close to the ground or it can be raised a considerable distance above the ground. The chain and bracket 85 are provided so that there will be a stop for member 60 when the same is lowered by links 12.

From the above description it will be seen that I have provided a comparatively simple and yet very efficient saw carrying device which can be readily attached to the power takeoff mechanism of a tractor. The saw can be moved through a wide range of movement for operating on trees or logs in both horizontal and vertical positions. The belts used to drive the saw are maintained in proper engagement with the pulleys by the brackets 50 and 52 and the tightener 53. There will be a little skewing of the belts when the device is moved to bring the saw into horizontal position but the driving function of the belts will not be impaired. While the device could be attached to most any tractor, as illustrated, it has been designed for use with the well known Ford or Ferguson tractor. The device is arranged for easy and convenient operation and manipulation. The same has been actually demonstrated in actual practice and found to be very successful and efficient.

It will of course be understood that various changes may be made in the form, details, arrangements and proportions of the parts, without departing from the scope of applicant's invention, which generally stated, consists in a device capable of carrying out the objects above set forth, in the parts and combinations of parts disclosed and defined in the appended claims.

What is claimed is:

1. A saw attachment for a tractor, which tractor has a frame with a power take-off shaft at one end thereof having in combination, a bracket adapted to be attached to said frame adjacent said shaft, a gear box means adapted to be loosened for securing said box to said brackets, said means including a gear box rotatable about the axis of said shaft relatively to said bracket when said means is loosened, a beveled gear in said box secured to said take-off shaft, a second beveled gear in said box meshing with said beveled gear, a second shaft secured to said second beveled gear extending at right angles to said take-off shaft, a yoke extending about said gear box and mounted to swing about the axis of said second shaft, a second yoke having portions embracing said yoke at its top and bottom and pivotally connected thereto to swing about an axis at right angles to the axis of said second shaft, an elongated supporting arm secured to said second yoke, and extending forwardly quite a distance from said second yoke, a bearing carried in the front end of said arm and swingable relatively thereto about a vertical axis when said second shaft is in a horizontal position, a third shaft journaled in said bearing, a circular saw secured to said third shaft disposed in a vertical plane when said second shaft is in a horizontal position, means for driving said third shaft from said second shaft, and a member extending transversely of said arm below the same and adapted to be raised by said tractor for raising said arm whereby said arm and saw can be swung with said second yoke about a vertical axis when said second shaft is in a horizontal position and can be swung with said first yoke about the axis of said second shaft when the latter is in horizontal position and whereby said gear box can be rotated 90 degrees when said first mentioned means is loosened and can be held in such position when said first mentioned means is tightened and said arm and saw, which saw is now in a horizontal plane, can be swung about horizontal and vertical axes.

2. The structure set forth in claim 1, and a stop means for limiting the downward movement of said member.

3. The structure set forth in claim 1, a third yoke embracing said arm and slidable on said member, a cable having its ends secured to opposite sides of said third yoke, pulleys secured adjacent the ends of said member respectively over which said cable runs, a reel upon which said cable is wound, and means for rotating said reel to move said cable and move said arm toward one end or the other of said member, said saw moving with said arm.

4. A saw attachment for a tractor, which tractor has a frame with a power take-off shaft at one end thereof having in combination, a bracket adapted to be attached to said frame adjacent said shaft, a gear box means adapted to be loosened for securing said box to said brackets, said means including a gear box rotatable about the axis of said shaft relatively to said bracket when said means is loosened, a beveled gear in said box secured to said take-off shaft, a second beveled gear in said box meshing with said beveled gear, a second shaft secured to said second beveled gear extending at right angles to said take-off shaft, a yoke extending about said gear box and mounted to swing about the axis of said second shaft, a second yoke having portions embracing said yoke at its top and bottom and pivotally connected thereto to swing about an axis at right angles to the axis of said second shaft, an elongated supporting arm secured to said second yoke and extending forwardly quite a distance from said second yoke, a bearing carried in the front end of said arm and swingable relatively thereto about a vertical axis when said second shaft is in a horizontal position, a third shaft journaled in said bearing, a circular saw secured to said third shaft disposed in a vertical plane when said second shaft is in a horizontal position, means for driving said third shaft from said second shaft, a member extending transversely of said arm below the same and adapted to be raised by said tractor for raising said arm whereby said arm and saw can be swung with said second yoke about a vertical axis when said second shaft is in a horizontal position and can be swung with said first yoke about the axis of said second shaft when the latter is in horizontal position and whereby said gear box can be rotated 90 degrees when said first mentioned means is loosened and can be held in such position when said first mentioned means is tightened and said arm and saw, which saw is now in a horizontal plane, can be swung about horizontal and vertical axes, said member having vertical portions at its ends and horizontal portions extending from said vertical portions toward each other, and means for moving said arm to bring the same under either of said horizontal portions or to bring the same into position between said horizontal portions.

5. A saw attachment for a tractor, which tractor has a frame with a power take-off shaft at one end thereof having in combination, a bracket adapted to be attached to said frame adjacent said shaft, a gear box means adapted to be loosened for securing said box to said brackets, said means including a gear box rotatable about the axis of said shaft relatively to said bracket when said means is loosened, a beveled gear in said box secured to said take-off shaft, a second beveled gear in said box meshing with said beveled gear, a second shaft secured to said second beveled gear extending at right angles to said take-off shaft, a yoke extending about said gear box and mounted to swing about the axis of said second shaft, a second yoke having portions embracing said yoke at its top and bottom and pivotally connected thereto to swing about an axis at right angles to the axis of said second shaft, an elongated supporting arm secured to said second yoke and extending forwardly quite a distance from said second yoke, a bearing carried in the front end of said arm and swingable relatively thereto about a vertical axis when said second shaft is in a horizontal position, a third shaft journaled in said bearing, a circular saw secured to said third shaft disposed in a vertical plane when said second shaft is in a horizontal position, means for driving said third shaft from said second shaft whereby said arm and saw can be swung with said yoke about a vertical axis when said second shaft is in a horizontal position and can be swung with said first yoke about the axis of said second shaft when the latter is in horizontal position and whereby said gear box can be rotated 90 degrees to bring said saw into a horizontal plane by loosening said first mentioned means and then tightening the same to hold said arm and saw in said horizontal plane and said arm and saw can then also be swung about horizontal and vertical axes, a second bearing for said second shaft spaced from said gear box, a second bearing for said third shaft, a rigid link extending between said second and third bearings and pivotally connected at its ends to said bearings respectively.

6. The structure set forth in claim 5, said tractor having spaced links extending forwardly therefrom and pivoted at their rear ends for movement about a horizontal axis, a member extending transversely beneath said arm and having portions connected to said links so as to be raised by said tractor when said links are raised whereby said arm will be raised with said saw and will move about the axis of said second shaft when the latter is in a horizontal position.

References Cited in the file of this patent
UNITED STATES PATENTS

| Number | Name | Date |
| --- | --- | --- |
| 1,798,402 | Dibble | Mar. 31, 1931 |
| 1,830,871 | Domagala | Nov. 10, 1931 |
| 2,435,192 | Arsneau | Feb. 3, 1948 |
| 2,461,188 | Stoner | Feb. 8, 1949 |
| 2,462,314 | Fuqua | Feb. 22, 1949 |
| 2,463,232 | Zimicki | Mar. 1, 1949 |
| 2,542,952 | White | Feb. 20, 1951 |
| 2,560,641 | Goodlet | July 17, 1951 |